United States Patent [19]

Kojima et al.

[11] Patent Number: 5,146,599
[45] Date of Patent: Sep. 8, 1992

[54] SYSTEM FOR FETCHING A PLURALITY VECTOR-DATA GROUPS USING A PLURALITY OF ADDRESSING DEVICE

[75] Inventors: Keiji Kojima, Kodaira; Shunichi Torii, Musashino, both of Japan

[73] Assignee: Hitachi, Ltd., Tokyo, Japan

[21] Appl. No.: 489,884

[22] Filed: Mar. 7, 1990

Related U.S. Application Data

[63] Continuation of Ser. No. 106,502, Oct. 9, 1987, abandoned.

[30] Foreign Application Priority Data

Oct. 9, 1986 [JP] Japan .................. 61-239006

[51] Int. Cl.[5] .................. G06F 15/347
[52] U.S. Cl. .................. 395/800; 364/DIG. 1; 364/DIG. 2; 364/232.21; 364/931.51
[58] Field of Search ......... 395/800, 400, 425, DIG. 1, 395/DIG. 2; 364/730, 736

[56] References Cited

U.S. PATENT DOCUMENTS

| | | | |
|---|---|---|---|
| 4,128,880 | 12/1978 | Cray, Jr. ...................... | 364/200 |
| 4,172,287 | 10/1979 | Kawabe et al. ............... | 364/736 |
| 4,293,941 | 10/1981 | Muraoka et al. ............. | 364/200 |
| 4,525,796 | 6/1985 | Omoda et al. ................ | 364/200 X |
| 4,541,046 | 9/1985 | Nagashima et al. .......... | 364/200 |
| 4,594,682 | 6/1986 | Drimak ........................ | 364/900 |
| 4,641,275 | 2/1987 | Hatakeyama et al. ........ | 364/900 |
| 4,651,274 | 3/1987 | Omoda et al. ................ | 364/200 |
| 4,697,235 | 9/1987 | Motegi ......................... | 364/730 X |
| 4,723,206 | 2/1988 | Kojima et al. ................ | 364/200 |
| 4,779,192 | 10/1988 | Torii et al. .................... | 364/730 X |

FOREIGN PATENT DOCUMENTS

| | | |
|---|---|---|
| 0163279 | 4/1985 | European Pat. Off. |
| 0149213 | 7/1985 | European Pat. Off. |
| 0184828 | 6/1986 | European Pat. Off. |
| 0193654 | 10/1986 | European Pat. Off. |

*Primary Examiner*—Thomas C. Lee
*Assistant Examiner*—Robert B. Harrell
*Attorney, Agent, or Firm*—Antonelli, Terry Stout & Kraus

[57] ABSTRACT

A data processor in which a plurality of address generator circuits corresponding to mutually different elements are provided for respective input vectors. Each address generator circuit updates an address upon waiting the arrival of data accessed by the address generator circuit. Also, access requests by respective address generator circuits are issued with a shift of one clock between an adjacent request. Therefore an access request is issued for data every cycle so as to completely fill each cycle of the complete process.

13 Claims, 13 Drawing Sheets

FIG. 8

| NO. | INPUT | | | OUTPUT | | | | NOTES |
|---|---|---|---|---|---|---|---|---|
| | DCMP | ICMP | JCMP | NEW | STREQ | HIT | END | |
| 1 | = | × | < | 0 | 0 | 0 | 0 | CONTINUATION OF COMPARISON |
| 2 | = | < | ≥ | 1 | 1 | 1 | 0 | DETECTION OF COINCIDENCE |
| 3 | ≠ | < | × | 1 | 1 | 0 | 0 | DETECTION OF NON-COINCIDENCE |
| 4 | = | ≥ | ≥ | 0 | 1 | 1 | 1 | DETECTION OF BOTH END OF ONE SYSTEM AND COINCIDENCE |
| 5 | ≠ | ≥ | × | 0 | 1 | 0 | 1 | DETECTION OF BOTH END OF ONE SYSTEM AND NON-COINCIDENCE |

SYSTEM FOR FETCHING A PLURALITY VECTOR-DATA GROUPS USING A PLURALITY OF ADDRESSING DEVICE

This is a continuation of application Ser. No. 106,502, filed Oct. 9, 1987, now abandoned.

BACKGROUND OF THE INVENTION

The present invention relates to data processors, and more particularly to a data processor which is well suited to a symbol process such as character string data process.

As described in Japanese Patent Application Laid-open No. 87640/1978, a prior-art vector processor has handled as each vector element, data such as an integer or a floating point number which can be fetched at one time. This is because the prior-art vector processor has been used solely for the calculations of numerical values and has sufficed with the above function. The prior art has not taken into consideration an application to the field of a symbol process, that is, a case where each vector element is a character string, a list or the like of indefinite length.

The aforementioned prior art has had the problem that throughput lowers in a case where access of certain data needs to wait for the arrival of preceding data. This problem will now be briefly explained with reference to the drawings.

FIG. 9 shows an example of a vector operation in a symbol process. In the operation, two vectors X and Y are input, and a vector Z is output. Each element of the vector to be input consists of a tag part of 4 bytes and a key part of 12 bytes. In this operation, the key parts of the respective elements of the vectors X and Y are compared, and if they coincide, the pair of the tag parts of the respective elements is delivered as the element of the output vector Z, whereas if not, 0's are delivered (hereinbelow, this operation shall be called the "sequential search operation"). It is now assumed that a vector processor for executing the sequential search operation can read out data of 4 bytes at one time of fetch request. Then, $16 \div 4 = 4$ times of fetches are required for reading out one vector element.

A method shown in FIG. 10(a) is considered as a scheme for vector-processing the sequential search operation. Fetching and comparing the respective 4 bytes of the corresponding elements of input vectors from the left sides thereof are repeated for all the data of the vectors (numerals written in vector data in FIGS. 10(a)–10(c) denote the order of fetches). As depicted on the right side of FIG. 10(a), with this method, pipelining in which fetches and operations are performed in parallel is possible, and the process of the 4-byte data in each fetch unit is apparently completed in one machine cycle (MC).

The above method is excellent from the viewpoint of the pipeline implementation of the process, but it involves useless processing steps. For example, in the comparison between the key parts of elements X(0) and Y(0), non-coincidence is already found by the comparative operation of the first 4 bytes, namely, 'id56' and 'id23'. Accordingly, the comparative operations of the remaining 8 bytes, '0280051T' and '0183017A' are essentially unnecessary. Nevertheless, these unnecessary operations are also performed by the method illustrated in FIG. 10(a). This drawback becomes more conspicuous as the length of the elements is greater. As an expedient for avoiding the unnecessary operations, a vector processor based on a scheme shown in FIG. 10(b) has formerly been proposed by the same inventors as those of the present application (Japanese Patent Application No. 104543/1984). Herein, when coincidence/non-coincidence has been found after the comparison of 4 bytes in the key parts, the process is immediately shifted to the fetch of the next elements, and when not, succeeding data items in the key parts are fetched. With this method, data items to be subsequently fetched and operated are determined after the comparative operation, so that wasteful operations can be avoided. Since, however, elements to be subsequently fetched are determined according to the operated result in this method as depicted on the right side of FIG. 10(b), fetches and operations cannot be performed in parallel. That is, the pipeline implementation is impossible, and vacancies arise in the process.

SUMMARY OF THE INVENTION

An object of the present invention is to provide a data processor which does not give rise to a vacancy in a pipeline even in a data process, such as the sequential search operation shown in FIG. 10(b), wherein the access of certain data cannot be performed unless the arrival of preceding data is waited.

The above object is accomplished by disposing a plurality of address generator circuits corresponding to mutually different elements for respective input vectors, so that as regards each individual address generator circuit, an address is updated upon waiting the arrival of data accessed by the use of the address generator circuit, and that as regards all the address generator circuits, access requests by the respective address generator circuits are issued with a shift of one clock between the adjacent ones, whereby the access request is issued for data every cycle as the whole process, so as to fill up the vacancies of a pipeline.

The operation of the present invention will be briefly described with reference to FIG. 10(c) as to an example of the sequential search operation. In this example, two fetch counters i and i' are disposed. The counter i points to data within the even-numbered elements of vectors, and the counter i' data within the odd-numbered elements of the vectors. These two counters i and i' are alternately switched and used for fetches. By way of example, it is now assumed that a fetch request for data items x and y (4 bytes) within elements X(0) and Y(0) pointed to by the counter i has been issued. In the next cycle, the comparative operation of the data items x and y having arrived is executed, while the fetch of data items x' and y' within elements X(1) and Y(1) is simultaneously requested using the counter i' this time. Meanwhile, the operated result of x and y is reflected on the updating of the counter i. More specifically, if coincidence/non-coincidence is settled as the result of the operation, the counter i is caused to point to the head data of elements X(2) and Y(2), and if not, it is caused to point to the next data within X(0) and Y(0). In the still next cycle, a fetch request is issued using the counter i again, while at the same time x' and y' are compared, whereupon if coincidence/non-coincidence is settled, the counter i' is caused to point to the heads of elements X(3) and Y(3), and if not, it is caused to point to the next data within X(1) and Y(1).

As illustrated in FIG. 10(c), according to this method, when each counter is viewed, the operated result is reflected on the next fetch, so that useless fetches and operations are not involved, and when the whole process is viewed, the operation and the fetch are executed in parallel, so that the operations are completely pipelined to incur no vacancy.

BRIEF DESCRIPTION OF THE DRAWINGS

FIG. 8 is a truth table showing the functions of a next operation determination logic;

FIG. 11A is a diagram showing an example of list data, while

FIG. 12A is a diagram showing the order of data to be accessed in a list search operation, while

DESCRIPTION OF THE PREFERRED EMBODIMENTS

Now, an embodiment of the present invention will be described with reference to the drawings.

Figure 1:
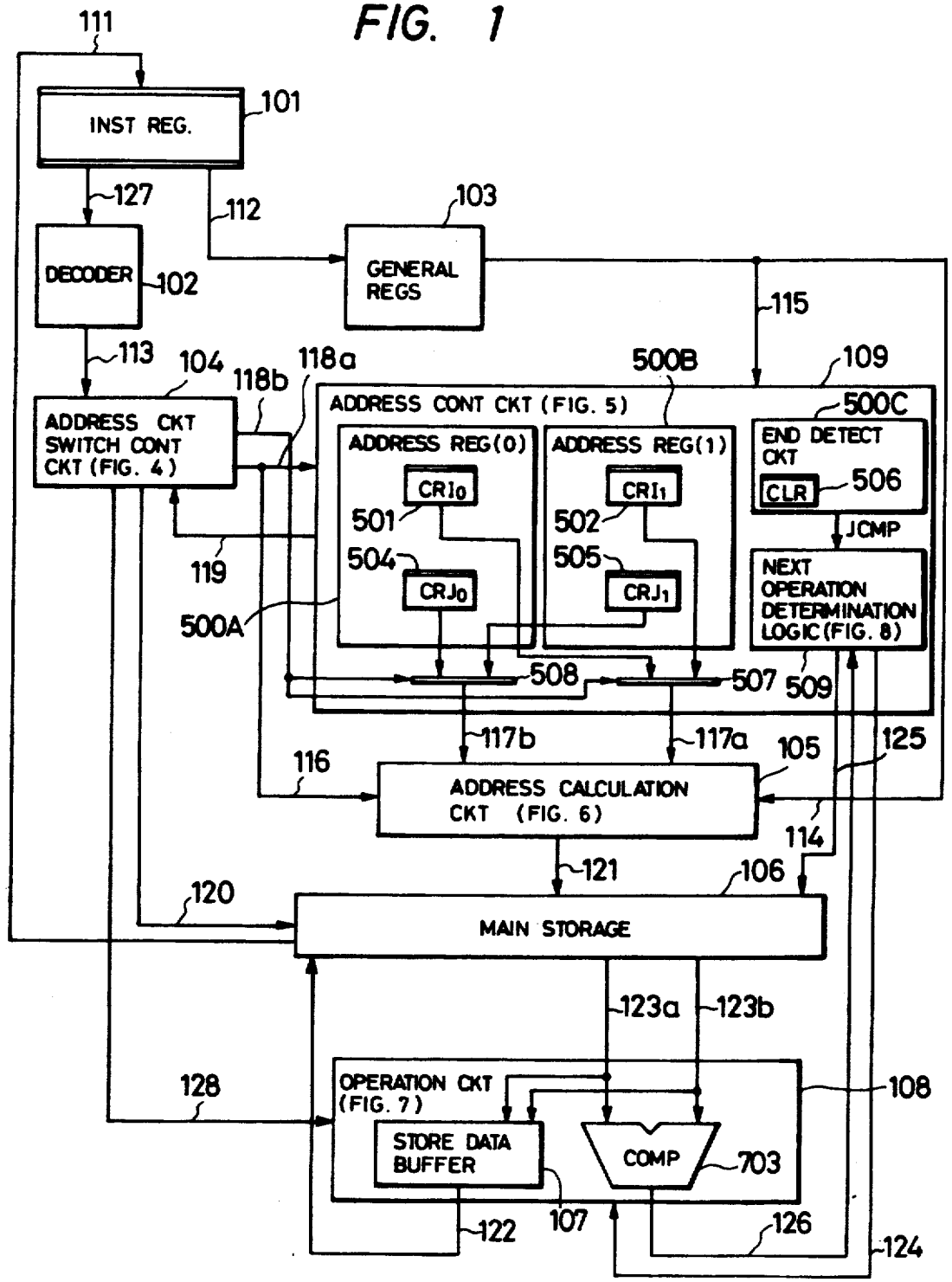
FIG. 1 is a general arrangement diagram of a vector processor in an embodiment of the present invention.

First, the arrangement and operation of a vector processor which is one embodiment of the present invention will be outlined in connection with FIG. 1.

A vector instruction stored in a main storage 106 is loaded in an instruction word register 101 through a data path 111, and is decoded by a decoder 102. When the code of the instruction has been found as the result of the decoding, an address system switch control circuit 104 is notified of that effect by a control signal 113, and a control circuit corresponding to the code of the instruction is started. In parallel with these operations, the content of a general-purpose register designated by the instruction is sent from general-purpose registers 103 through respective data paths 114 and 115 to an address calculation circuit 105 and an address control circuit 109 so as to be set up in these circuits. The setup is instructed by the address system switch control circuit 104.

Upon the completion of the setup, the address system switch control circuit 104 transmits a fetch request for operands to the main storage 106 through a control signal 120 every clock. The address control circuit 109 includes two counters indicative of elements to be operated, and two counters indicative of parts within the vector elements being processed, that is, four counters in total.

The value of one set in the two sets of counters is sent through a data path 117 to the address calculation circuit 105, in which a fetch address is calculated. Which of the counters is to have its value sent, is instructed by a control signal 118 from the address system switch control circuit 104. The fetch address is sent to the main storage 106 through a data path 121.

The main storage 106 which has received the fetch request and the address, transfers two fetched operands each being of 4 bytes to an operation circuit 108 through data paths 123 after one clock. In a case where the fetched data items are the first 4 bytes of the respective vector elements, namely, tag parts, they are also transferred to and held in a store data buffer 107. Whether or not the data items are the tag parts, is decided by the address control circuit 109 and is made known to the store data buffer 107 through a control signal 124.

The operand data items of 4 bytes are compared in the operation circuit 108, and the compared result is sent to the address control circuit 109 through a signal line 126. The counters within the address control circuit 109 are incremented according to this compared result. Which set of the two sets of counters is to be incremented, is similarly designated by the address system switch control circuit 104. When the coincidence of the vector elements is detected on the basis of the compared result and the statuses of the counters, the address control circuit 109 transmits a store request to the main storage 106 through a control signal 125. The coincidence detection signal is simultaneously sent to the store data buffer 107. Upon receiving the coincidence detection signal, the store data buffer 107 sends the pair of the tag parts having been held, to the main storage 106 through a data path 122 so as to be stored therein. Likewise to the fetch address, a store address is calculated by the address calculation circuit 105 on the basis of a counter value in the address control circuit 109 and is sent to the main storage 106.

When the non-coincidence of the vector elements is detected as the result of the comparative operation, "0"s are sent from the store data buffer 107 through the data path 122 to the main storage 106 so as to be stored therein.

The end of the operation is reported from the address control circuit 109 to the address system switch control circuit 104 through a signal line 119. Upon knowing the end of the operation, the address system switch control circuit 104 stops the transmission of the fetch request, and it reads out the next instruction from the main storage 106 and sets it in the instruction word register 101.

In the above, the arrangement and operation of the vector processor being one embodiment of the present invention have been outlined.

Figure 2:
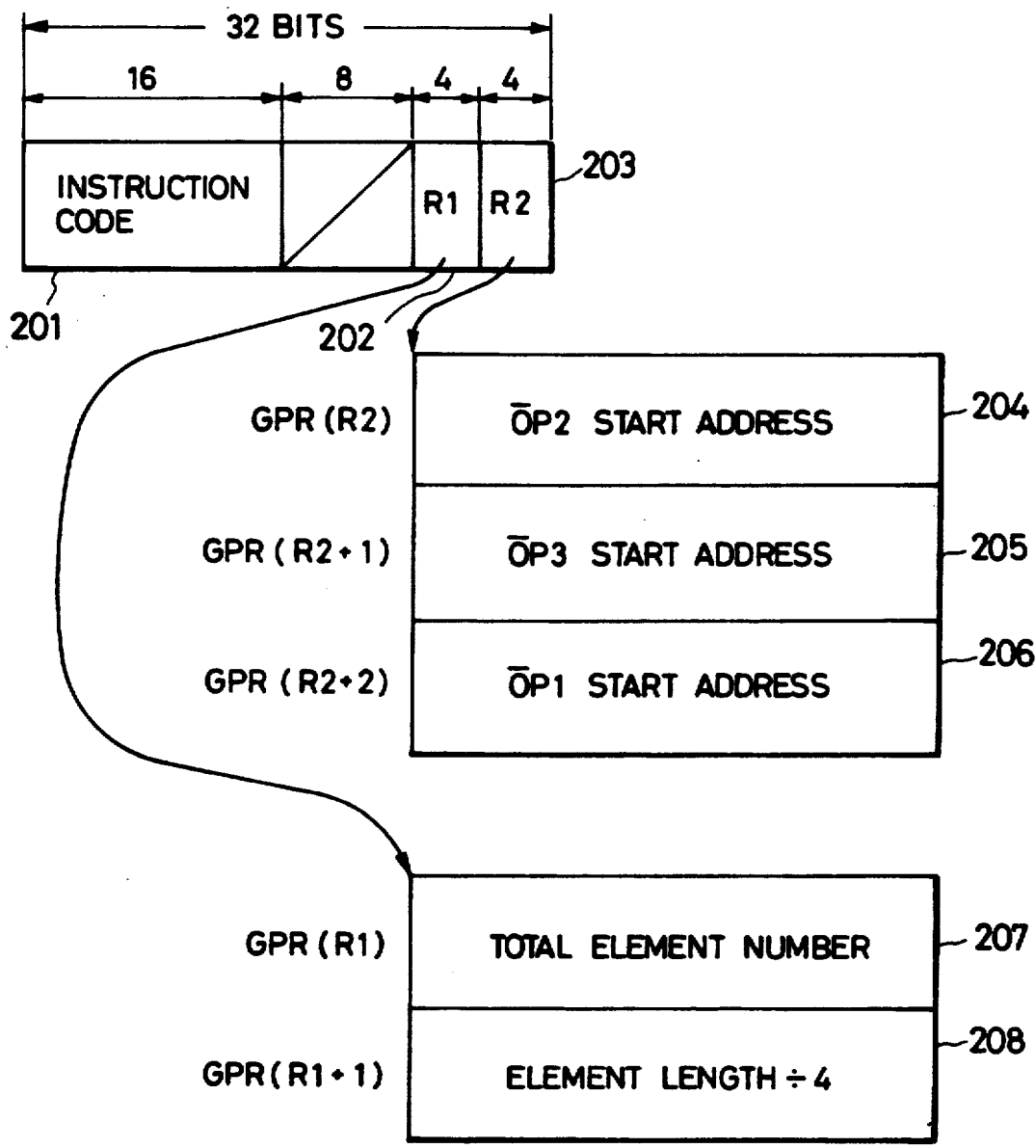
FIG. 2 is a diagram showing an instruction format.

Before the detailed description of the vector processor shown in FIG. 1, the instruction format of the vector instruction in the present embodiment will be elucidated with reference to FIG. 2. As shown in FIG. 2, the vector instruction is a bit string of 32 bits. The upper 16 bits of the instruction denotes the code 201 of the vector instruction. An R1 field 202 denotes a binary integer of 4 bits, and designates among the 16 general-purpose registers 103 assigned Nos. 0–15, a general-purpose register 207 of No. specified by the R1 field 202 and a general-purpose register 208 serial to the general-purpose register 207. The general-purpose register 207 denotes the total number of vector elements, while the general-purpose register 208 denotes a value resulting in such a way that the length of the vector element is divided by 4 which is the unit of one time of fetch. Likewise, an R2 field 203 in the instruction designates 5 general-purpose registers 204, 205 and 206. The general-purpose registers 204 and 205 indicate the start addresses of two vectors being inputs, respectively, and the general-purpose register 206 denotes the start address of an output vector.

Figure 9:
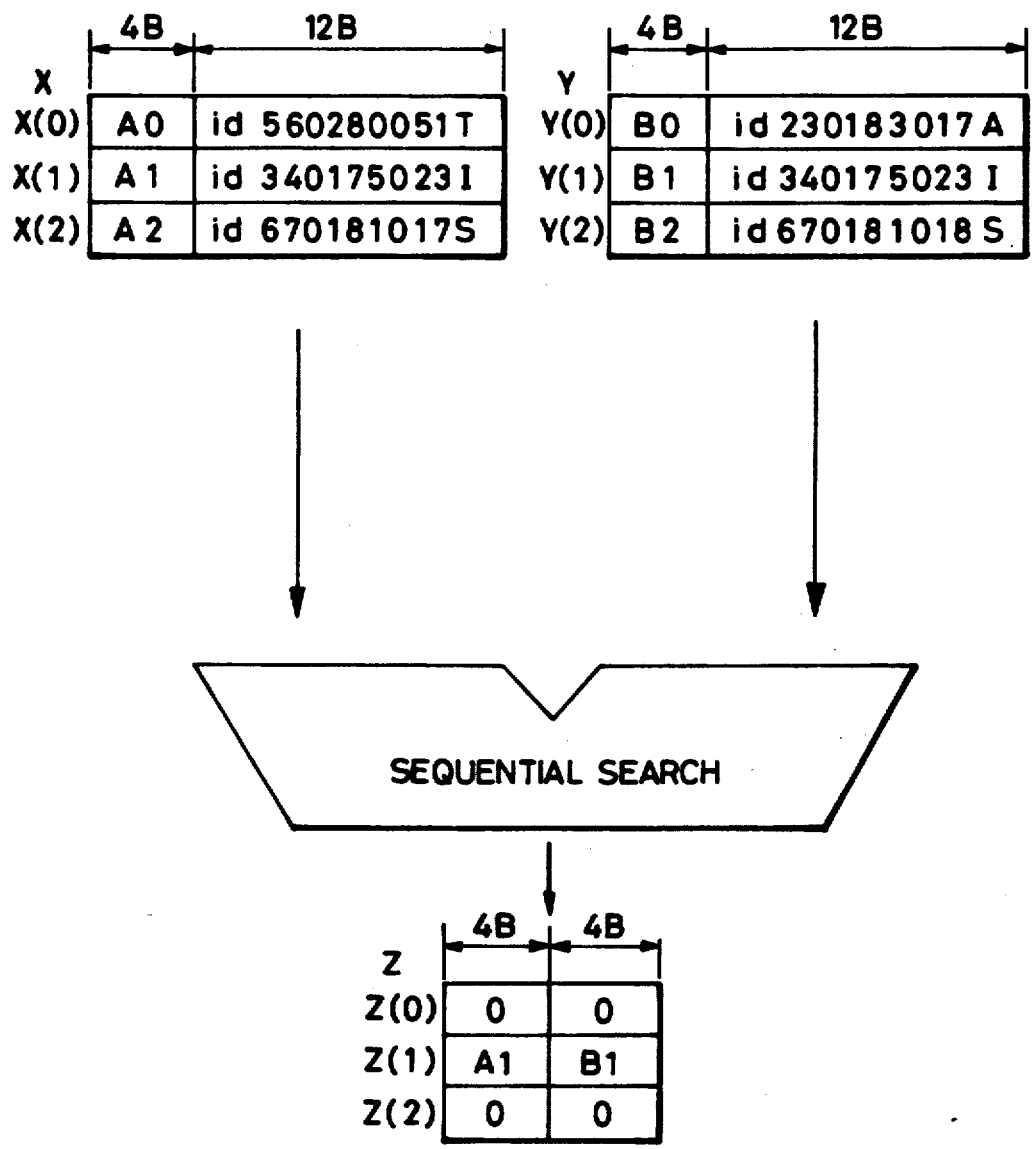
FIG. 9 is a diagram showing an example of a sequential search operation.

By way of example, in case of the sequential search operation in FIG. 9, the number of elements of each vector is 3, and hence, "3" is set in the general-purpose register 207. Besides, since the element length is 6 bytes, "4" is set in the general-purpose register 208. The start addresses of the vectors X, Y and Z may be set in the general-purpose registers 204, 205 and 206, respectively. In the above, the instruction format has been explained.

Next, the detailed operation of the vector processor shown in FIG. 1 being one embodiment of the present invention will be described in connection with the drawings, by taking as an example how the sequential search operation mentioned in FIG. 9 is processed by the vector processor of the present embodiment. In the concrete, the flow of a time chart in FIG. 3 illustrative of the proceeding of the process will be traced by referring to the block diagrams etc. of several pertinent logic circuits (FIGS. 4–8).

Figure 3:
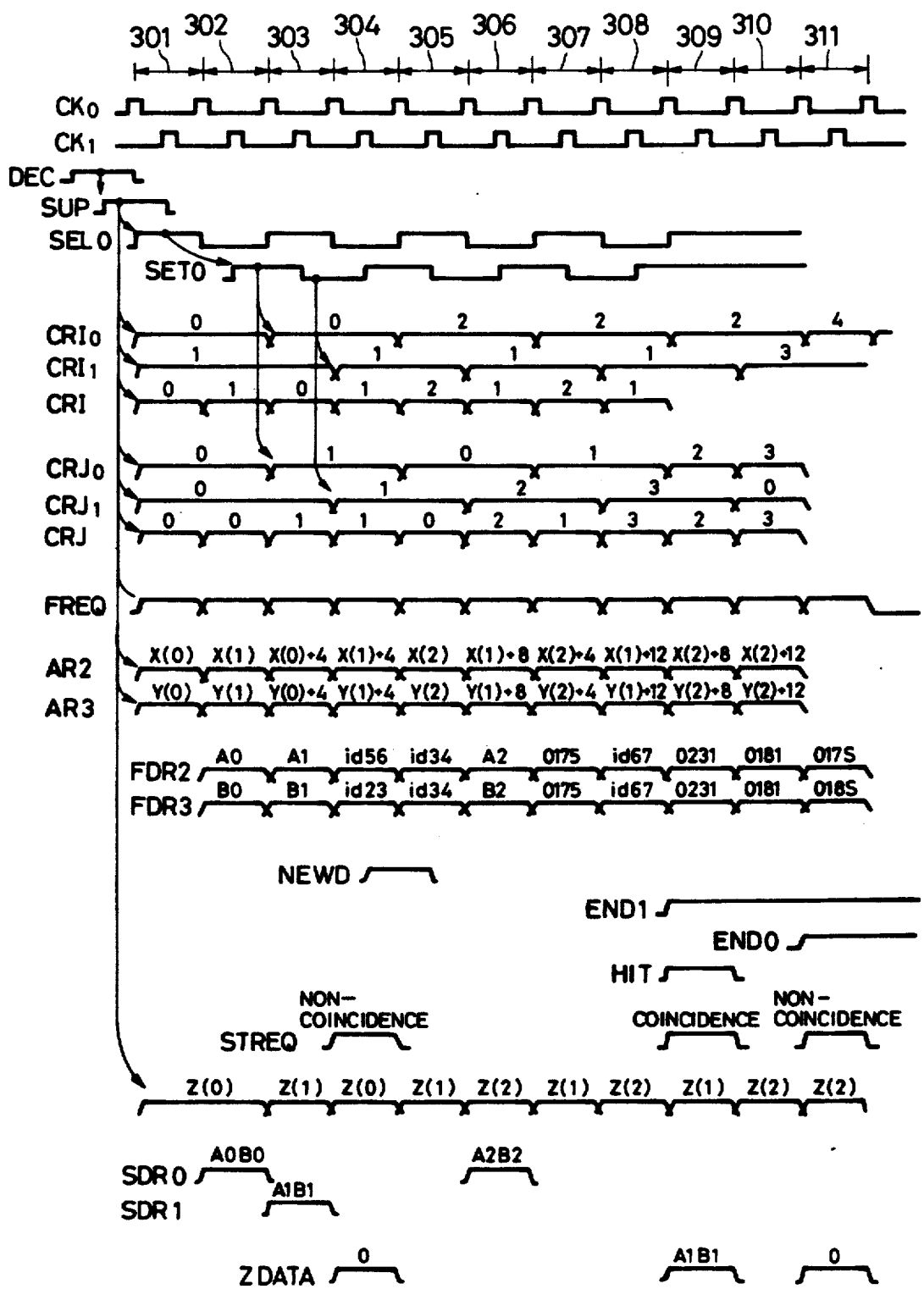
FIG. 3 is a time chart showing the general operation of the embodiment.

FIG. 3 is the time chart which illustrates the operation of the vector processor in FIG. 1 in the case of receiving the vectors X and Y in FIG. 9 as inputs. As shown in FIG. 3, in the vector processor, clock signals $CK_0$ and $CK_1$ in two phases are used for synchronization.

Figure 4:
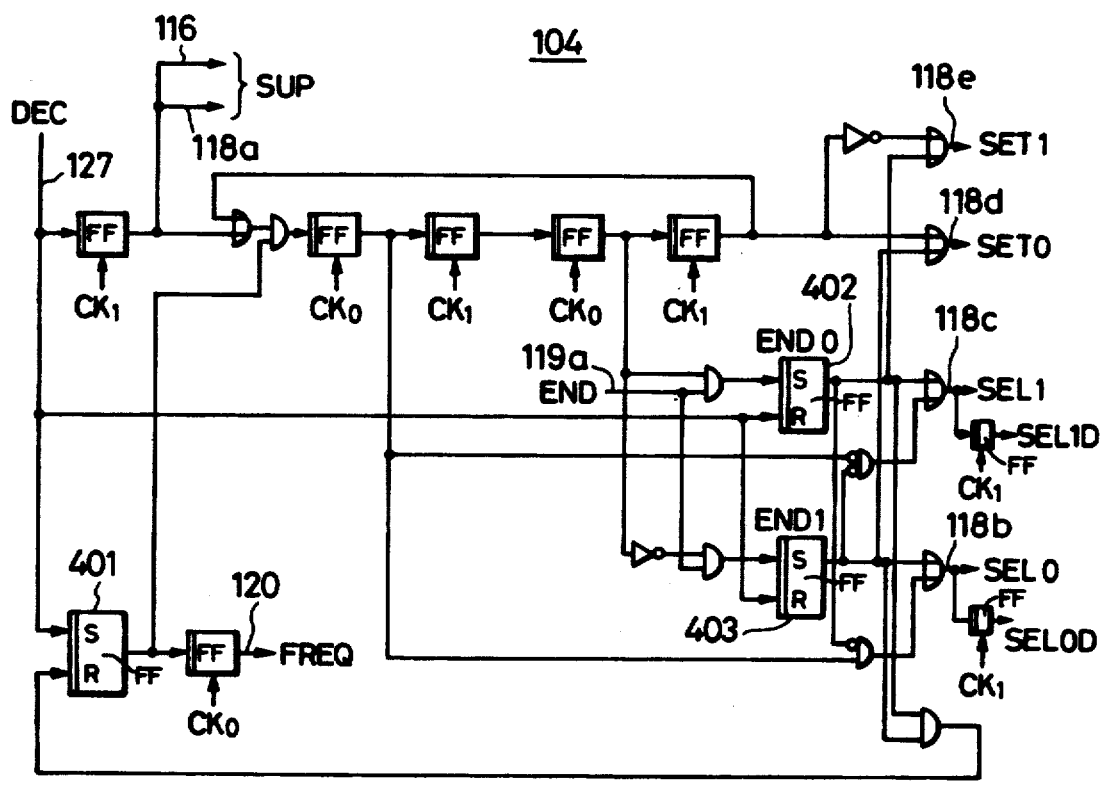
FIG. 4 is a block diagram of a address system switch control circuit.

When the vector instruction of the format of FIG. 2 loaded in the instruction register 101 has been found the sequential search instruction as the result of the decoding, a control signal DEC (127) indicating to that effect is sent to the address system switch control circuit 104 shown in FIG. 4. The address system switch control circuit 104 having received the DEC signal transmits a setup instructive signal SUP (116, 118a) to the address calculation circuit 105 and the address control circuit 109, and sets a hold type flip-flop 401 which indicates an entry into the processing state of a sequential search instruction. Simultaneously, it resets hold type flip-flops 402 and 403 which indicate the end of the sequential search instruction. The signal SEL0 (118b) becomes "1" one clock after the DEC signal, and thenceforth, it repeats "0" and "1" every second cycle until the END signal (119a) arrives. The SEL0 signal is a signal which indicates that, in the counters of two groups, group-0 and group-1 within the address control circuit 109, the group-0 is being used for the address calculation. Conversely to the SEL0 signal, a signal SEL1 (118c) is a signal which indicates that the group-1 counters are being used. A signal SET0 (118d) is a signal instructive of incrementing the group-0 counters, while a signal SET1 (118e) is a signal instructive of incrementing the group-1 counters. The transmission of the fetch request signal FREQ (120) is started one clock after the DEC signal, and thenceforth, it continues until both the flip-flops 402 and 403 indicative of the end are set.

Figure 5:
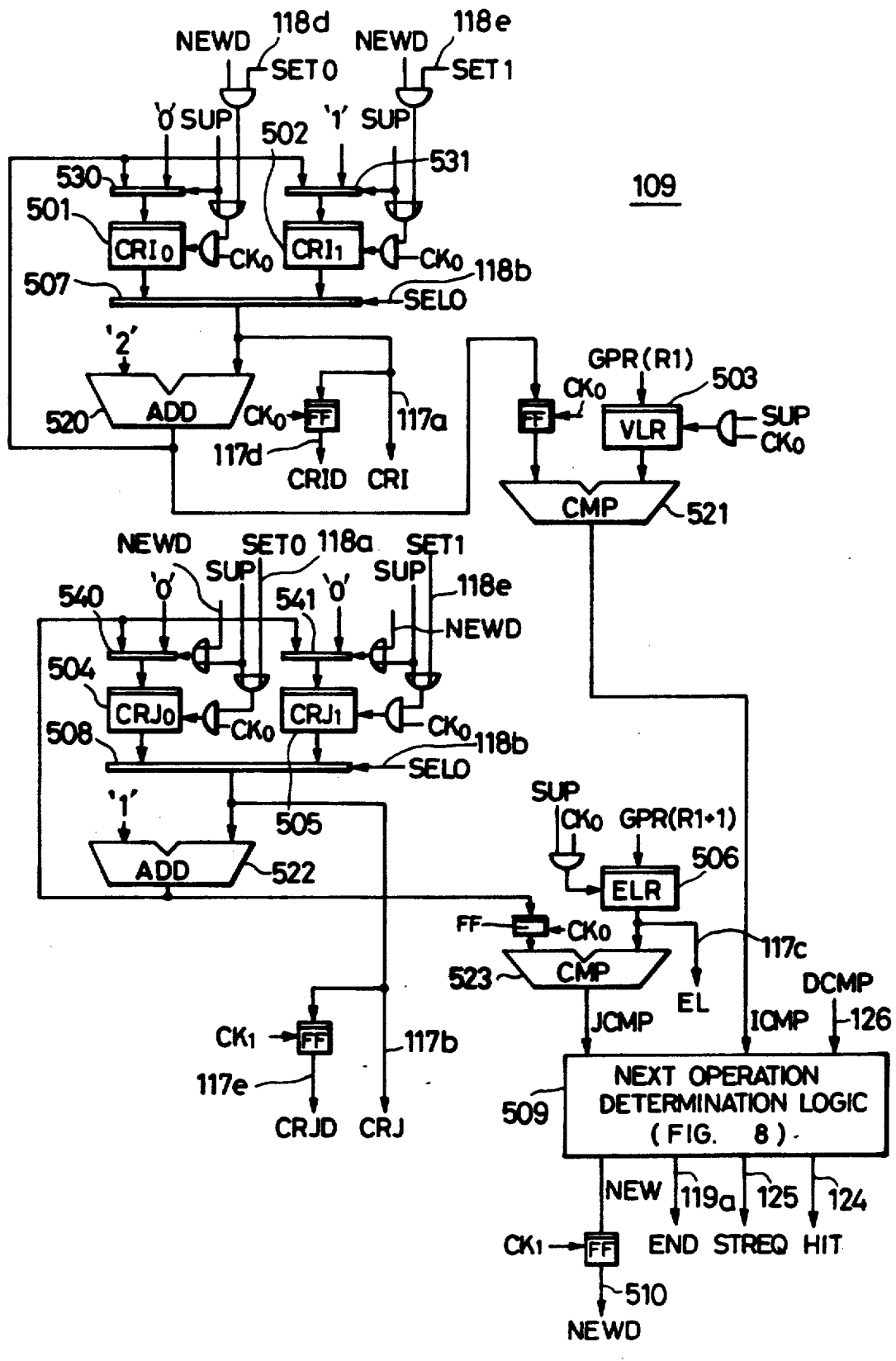
FIG. 5 is a block diagram of an address control circuit.

When the SUP signal (118a) is sent to the address control circuit 109 shown in FIG. 5, the group-0 counters $CRI_0$ (501) and $CRJ_0$ (504) are initialized to "0". In addition, the group-1 counters $CRI_1$ (502) and $CRJ_1$ (505) are respectively initialized to "1" and "0". The counters $CRI_0$ and $CRI_1$ are registers which indicate No. of the vector elements being processed, while the counters $CRJ_0$ and $CRJ_1$ are registers which indicate data within the vector elements being processed. By way of example, when the group-0 counters $CRI_0$ and $CRJ_0$ have values "2" and "1" respectively, it is indicated that the group-0 is processing the fourth - seventh bytes of the vector elements X(2) and Y(2). In the initial state, accordingly, it is indicated that the group-0 is processing the heads of X(0) and Y(0), while the group-1 is processing the heads of X(1) and Y(1).

The values of the general-purpose registers 207 and 208, namely, "3" and "4" are respectively set up in a vector element number register VLR (503) and a vector element length register ELR (506). The value of the counter $CRI_0$ or $CRI_1$ is sent to the address calculation circuit 105 through a selector 507. The selector 507 is supplied with the counter selection signal SEL0 from the address system switch control circuit 104, whereupon when the signal SEL0 is "1", the value of the counter $CRI_0$ is sent through the data path CRI (117a), and when it is "0", the value of the counter $CRI_1$ is sent therethrough. The same applies to the counters $CRJ_0$ and $CRJ_1$, and when the signal SEL0 is "0", the value of the counter $CRJ_0$ is sent to the address calculation circuit 105 through the data path CRJ (117b), while when not, the value of the counter $CRJ_1$ is sent. By way of example, the signal SEL0 is "1" one clock after the DEC signal (in a cycle 301 in FIG. 3), so that the address calculation circuit 105 is supplied with "0" through the counter CRI and also with "0" through the counter CRJ.

Figure 6:
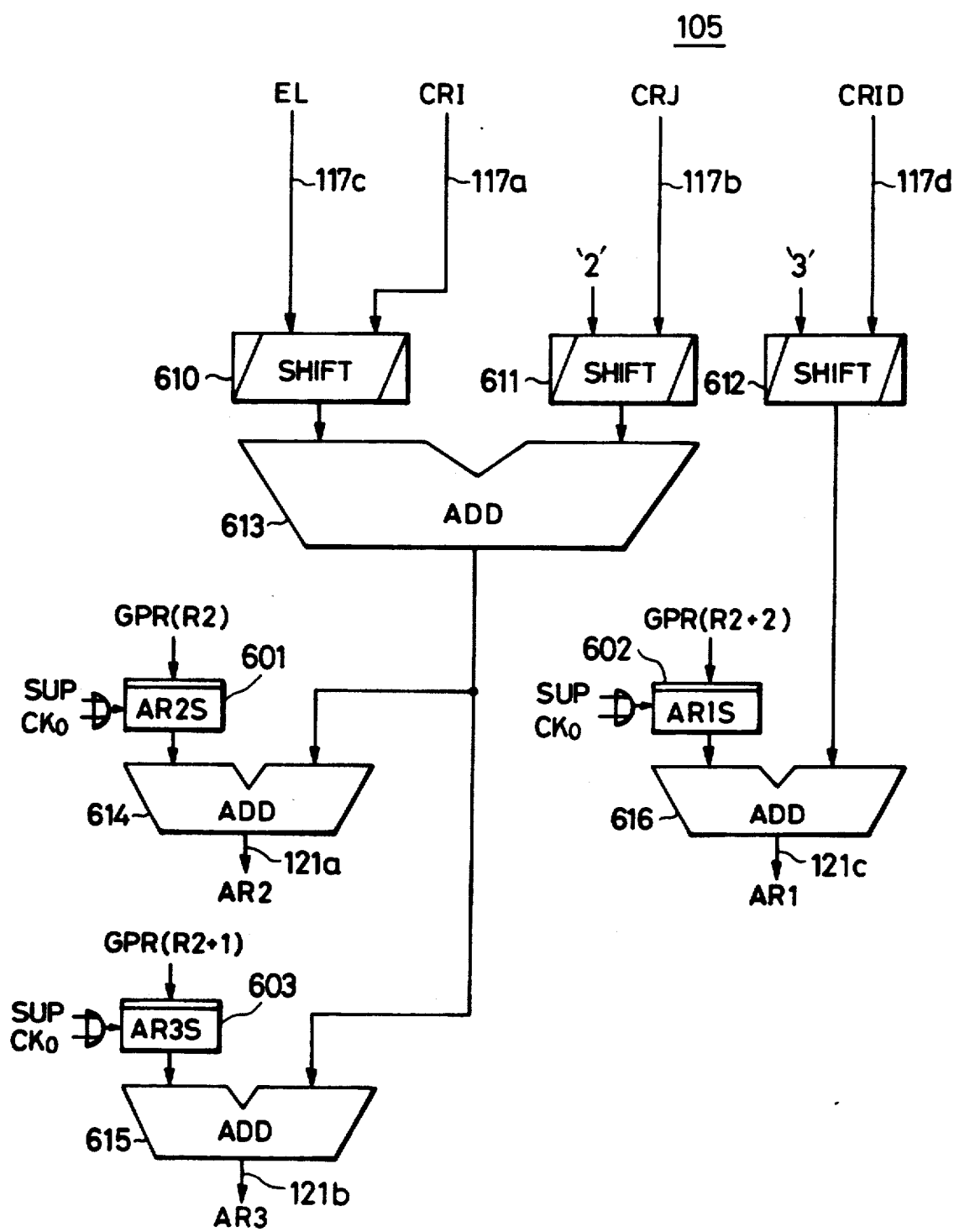
FIG. 6 is a block diagram of an address calculation circuit.

Upon receiving the SUP signal (116), the address calculation circuit 105 in FIG. 6 sets up the values of the general-purpose registers, namely, the start addresses of the vectors X, Y and Z in start address registers AR2S (601), AR3S (603) and AR1S (602), respectively. The address calculation circuit 105 calculates a fetch address AR2 (121a) for the vector X, a fetch address AR3 (121b) for the vector Y and a store address AR1 (121c) for the vector Z, and sends them to the main storage 106. The following values are calculated by the circuit in FIG. 6:

$$AR2 = \text{start address of } X + CRI \times 16 + CRJ \times 4 \quad (1)$$

$$AR3 = \text{start address of } Y - CRI \times 16 + CRJ \times 4 \quad (2)$$

$$AR1 = \text{start address of } Z + CRID \times 8 \quad (3)$$

As already stated, CRI indicates No. of the elements to be processed next, and CRJ indicates No. of the data items within the elements to be processed next. In addition, each of the elements of the vectors X and Y consists of 16 bytes, and 4 bytes of the respective elements are processed. Therefore, the addresses of the operand data items to be subsequently processed or fetched are calculated by the aforementioned formulas (1) and (2). Since the element of the vector Z consists of 8. bytes (the length of the tag part $\times 2$), the store address is evaluated by the formula (3). (Since the store operation is performed one clock after the fetch operation, the delay signal CRID of the signal CRI is used.) In the processing cycle 301, CRI=CRJ=0 holds, so that the fetch addresses AR2 and AR3 become the start addresses of the vectors X and Y respectively, and the first 4 bytes of the vector elements X(0) and Y(0) are fetched.

The fetch data items arrive at the operation circuit 108 in a processing cycle 302 in FIG. 3.

Figure 7:
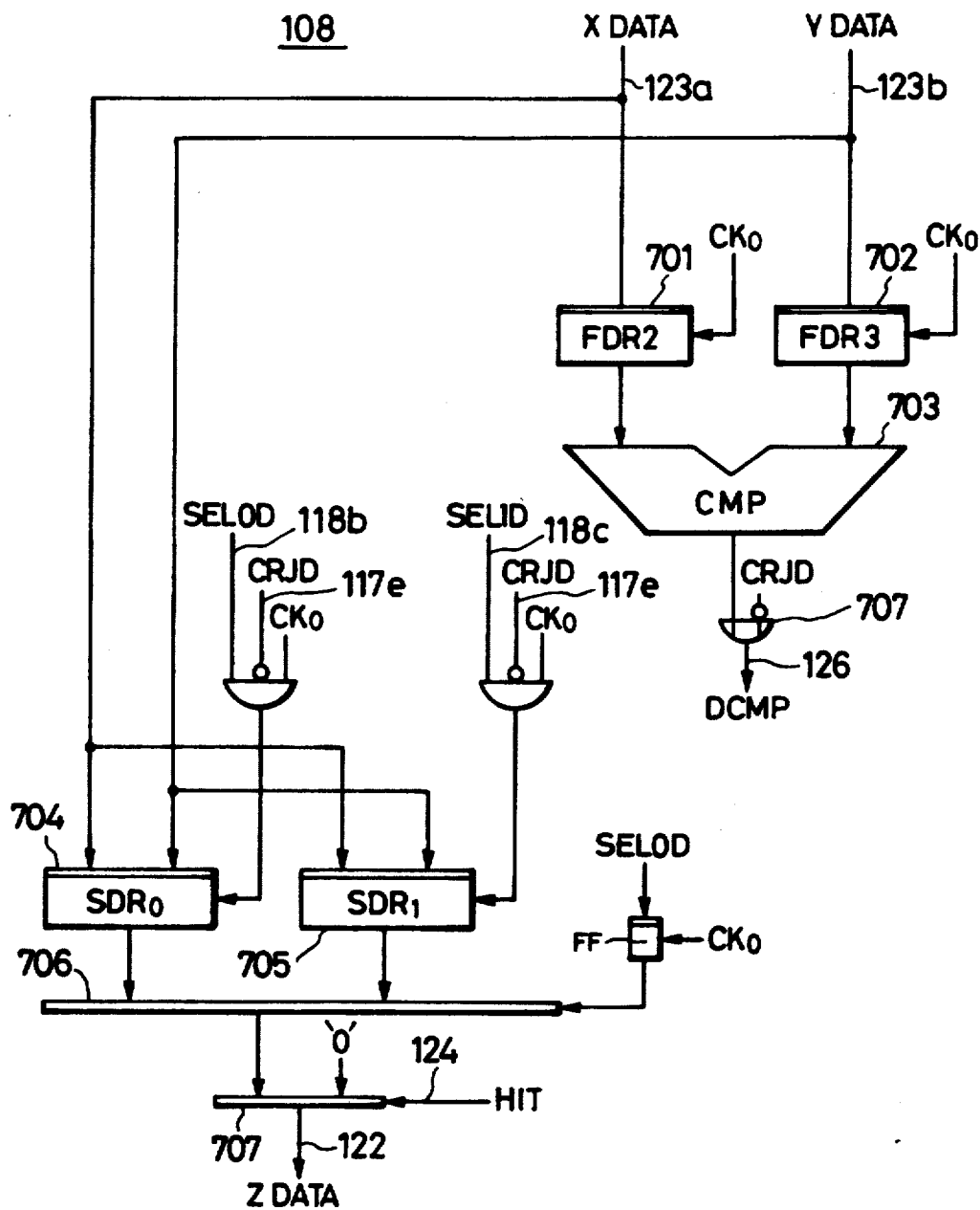
FIG. 7 is a block diagram of an operation circuit.

FIG. 7 is a diagram showing the arrangement of the operation circuit 108. The fetch data XDATA for the vector X is sent to the operation circuit 108 through the data path 123a, while the fetch data YDATA for the vector Y is sent thereto through the data path 123b, and they are respectively set in fetch data registers and 702. A comparator 703 compares the values of the registers 701 and 702, and transmits the comparison result signal DCMP (126) to the address control circuit 109. In a case where the fetch data items are data of the tag parts, the pair of the tag parts is set in a store data register $SDR_0$ (704) or $SDR_1$ (705). If the data items are the tag parts, is indicated by the 1-clock delay signal CRJD (117e) of the signal CRJ. The reason is that, when the signal CRJ is "0", the tag parts have been read out, so the data items arrive at the operation circuit 108 in the next cycle to the fetch request. In other words, when the signal CRJD is "0", the tag parts have arrived at the operation circuit 108. Likewise, which of the registers $SDR_0$ and $SDR_1$ the data items are to be set in is specified by the delay signal of the signal SEL0. That is, the data items corresponding to the group-0 arrive at the operation circuit 108 in the next cycle to the cycle in which the signal SEL0 was "1". In the processing cycle 302, the data items arriving at the operation circuit 108 are the tag parts ("A0", "B0"), so that the pair of the tag parts ("A0B0") is set in the register $SDR_0$.

Regarding the data items of the tag parts, the comparison is inhibited by an OR gate 707 (coincidence is decided without fail).

In the processing cycle 302, SEL0=0 and SEL1=1 hold, and hence, CRI=1 and CRJ=0 are held, so that a fetch request for the first 4 bytes of the respective elements X(1) and Y(1) is issued.

The address control circuit 109 in FIG. 5 having received the comparison result signal DCMP sends this signal DCMP, the comparison result signal ICMP between CRI+2 and VLR, and the comparison result signal JCMP between CRJ+1 and ELR to a next operation determination logic 509. The next operation determination logic 509 determines operations to be subsequently performed, on the basis of the comparison results, and transmits the determined results to respective portions as control signals NEWD (510), END (119a), STREQ (125) and HiT (124) so as to control the operations.

FIG. 8 is a truth table which indicates the operation of the next operation determination logic 509. The case of Item No. 1 indicates a state in which the fetch data items are equal, the vector elements have not run out, and intermediate parts within the vector elements are being processed. On this occasion, the comparison may be continued. For example, in the processing cycle 302, the signal DCMP indicates "=" (as stated before, the coincidence is forcibly established because the arrival data items are the tag pairs), the signal ICMP indicates "2<3", and the signal JCMP indicates "1<4", so that this processing cycle 302 corresponds to the case of Item No. 1. Accordingly, NEWD=0 holds, so that at the end of the processing cycle 302, the counter $CRI_0$ is left intact, while the counter $CRF_0$ is subjected to "+1". That is, in the next cycle 303, a fetch request for data items at an address X(0)+4 and an address Y(0)+4 is issued. In the processing cycles 303, the first 4 bytes (tag parts) of the vector elements X(1) and Y(1) arrive at the registers FDR2 and FDR3, and the operation corresponding to Item No. 1 is similarly selected. In a processing cycle 304, a fetch request for data items at an address X(1)+4 and an address Y(1)+4 is issued. In the processing cycle 304, "id56" and "id23" which are the data items corresponding to the addresses X(0)+4 and Y(0)+4 requested in the preceding cycle are set in the registers FDR2 and FDR3, respectively. The compared result DCMP of both these data items becomes "≠", the result ICMP becomes "2<3", and the result JCMP becomes "2<4". Therefore, this is the case of Item No. 3. The case of Item No. 3 indicates that the non-coincidence of the elements has been detected. In this case, the store request signal STREQ (125) is transmitted to the main storage 106. As the store data ZDATA (122), "0" is sent because the signal HiT (124) is "0". In the case of Item No. 3, NEWD=1 holds, so that at the end of the processing cycle, the counter $CRI_0$ is subjected to "+2" and comes to have a value "2", while the counter $CRF_0$ is returned to "0". In the next cycle 305, accordingly, a fetch request for the first 4 bytes of the respective elements X(2) and Y(2) is requested as the operation of the group-0. In this manner, the signal NEWD indicates that coincidence/non-coincidence has been settled for certain elements, and that the processor operation shifts to the process of different elements.

The operations of the processing cycles 304 and 305 clearly show the features of the present embodiment. In the processing cycle 304, non-coincidence is already found midway of the comparison of the elements X(0) and Y(0). Therefore, the comparison of the remaining parts of the elements X(0) and Y(0) is omitted, and the process is shifted to the fetch request for the elements X(2) and Y(2) in the processing cycle 305, thereby to make the process efficient (operation corresponding to the group-0 counters). On the other hand, the fetch request for the fourth-seventh bytes of the elements X(1) and Y(1) is issued in the processing cycle 304, and the fetch data items arrive and are operated in the processing cycle 305 (operation corresponding to the group-1 counters). Thus, when the group-0 and group-1 are individually viewed, data items are fetched every second clock (for example, the fetches of the group-0 are done in the processing cycles 301, 303, 305, . . . , and the fetches of the group-1 are done in the cycles 302, 304, 306, . . . ), and an operated result is reflected on the corresponding fetch so as to eliminate a waste in the process. On the other hand, when the group-0 and group-1 are viewed in combination, the fetch and the operation are performed in parallel (group-0 fetch and group-1 operation, or group-1 fetch and group-0 operation), and a pipelined operation at a pitch of one clock is realized.

In processing cycles 306-308, the processor operation proceeds similarly to the foregoing.

In a processing cycle 309, the 12th-15th bytes of the elements X(1) and Y(1), namely, "023I" and "023I" arrive and are operated. The compared result DCMP is equal with ICMP being "3=3" and JCMP being "4=4", and this corresponds to the operation of Item No. 4 in FIG. 8. Item No. 4 is a case where the complete coincidence of elements has been detected and where the operation of one group has ended. In this case, the store request signal STREQ is issued, and HiT=1 is held. The store data buffer 107 having received the signal HiT selects the value "A1B1" of the group used for the comparison (herein, the group-1) in the group-0 store data register $SDR_0$ and the group-1 store data register $SDR_1$, and it sends the selected value to the main storage 106 through the data path 122 so as to be stored therein. In the case of Item No. 4, the group-1 operation is thus completed, so that the signal END (119a) is sent to the address system switch control circuit 104 in FIG. 4 and sets the hold type flip-flop END1 (403) for indicating the end of the group-1. Since the setting of the flip-flop END1, SEL1=0 and SEL0=1 are forcibly established, and the group-0 operation is continuously performed. For example, in both processing cycles 310 and 311, SEL0=SET0=1 holds, and the group-0 counters are selected and incremented. In this manner, the present embodiment is free from the drawback that, since the end of the operation of one group, the operation of the other group proceeds every second clock, to lower the efficiency.

The cases of Item No. 2 and Item No. 4 in FIG. 8 differ in whether or not the signal END is sent, and are quite the same in the other respects. In the processing cycle 311, the last 4 bytes of the elements X(2) and Y(2), namely, "017S" and "018S" arrive and are compared. The operation on this occasion corresponds to Item No. 5 in FIG. 8 because the result DCMP is "$\neq$", ICMP is "$4 \geqq 3$" and JCMP is "4=4". That is, it is a case where noncoincidence is detected and where the operation of this group is also ended. In this case, "0" is similarly stored, and the END signal is sent. The address system switch control circuit 104 having received the END signal sets the hold type flip-flop END0 (402) for indicating the end of the group-0 operation. Since the flip-flop END1 is already set, END0.END1 holds, and the flip-flop 401 indicating the proceeding of the sequential search operation is reset, so that the fetch request FREQ is also stopped to end the sequential search.

As described above, the present embodiment realizes the sequential search operation which involves no useless comparison and in which fetches and operations are performed in parallel.

In the present embodiment, it is assumed for the sake of brevity that data arrives one clock after a fetch request. In general, however, there are many processors in which data arrives 3–4 clock later. Even in such cases, fetch counters are further provided (in the present embodiment, the two groups of the group-0 and group-1), whereby the pipeline process of 1-clock pitch is permitted by quite the same expedient. For example, in a case where data arrives 3 clocks later, 4 groups of counters are provided and are successively switched and used, whereby waits for the arrivals of the data can be filled up.

Moreover, although the above embodiment has been explained as to the case where the vector elements are character strings of fixed length, the present invention is also applicable to a case where the elements are lists having character strings of variable length or a chain structure.

Now, there will be described the case where the elements are of variable length. With the address control circuit 109 in FIG. 5, the element length register ELR (506) is supplied with the setup instructive signal SUP (118a), whereby the fixed element length is set in the general-purpose register 208 at the start of an instruction. In order to realize the process of the variable-length elements, a measure disclosed in, for example, Japanese Patent Application No. 104543/1984 may be taken according to which information items indicating the lengths of the respective elements are stored in the main storage 106 in the form of vectors beforehand, whereupon the information item is set in the element length register ELR (506) by employing the start instructive signal NEWD (510) for the next element process as a trigger.

Next, the application of the present invention to the lists will be briefly explained.

Figure 11A:
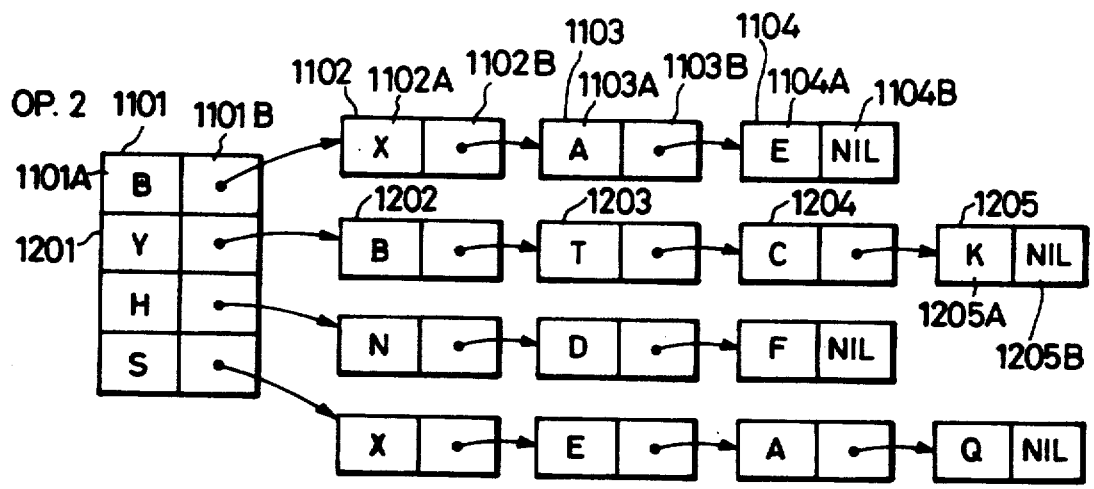
Figure 11B:
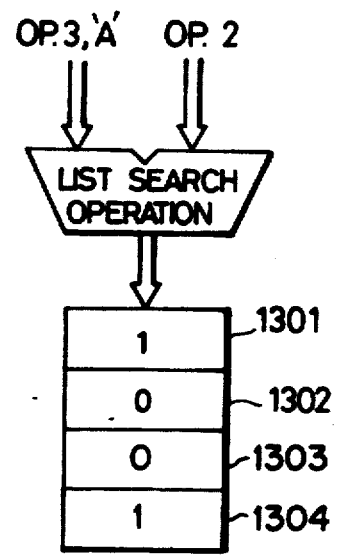
FIG. 11B is a diagram showing an example of the result of a list search operation.

FIGS. 11A and 11B are diagrams showing an example of a search operations for lists. In the list structure, each data element consists of two, first half and latter half parts, and data is stored in the first half, while a pointer pointing to the address of the next data element is stored in the latter half. By way of example, a data element 1101 consists of two parts 1101A and 1101B, and the part 1101A stores data "B", while the part 1101B stores a pointer pointing to the address of a succeeding data element 1102. The end of a chain is indicated by storing a fixed value "NIL" instead of the pointer. Here, the "list search operation" signifies a process which checks whether or not a data item equal to a search value exists among the data items stored in the single chain connected by the pointers.

FIG. 11B shows the operations and the result thereof in the case where the search value is "A". In a chain of elements 1101, 1102, 1103 and 1104, "A" is stored in the data element 1103, so that "1" is stored as an operated result 1301. Besides, in a chain of elements 1201, 1202, 1203, 1204 and 1205, "A" is not included, so that "0" is stored as an operated result 1302.

Figure 12A:
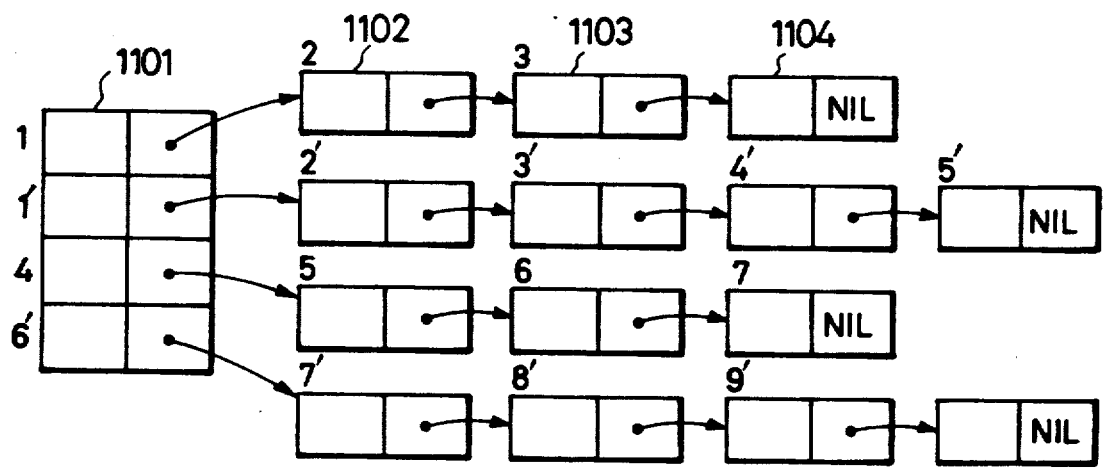
Figure 12B:
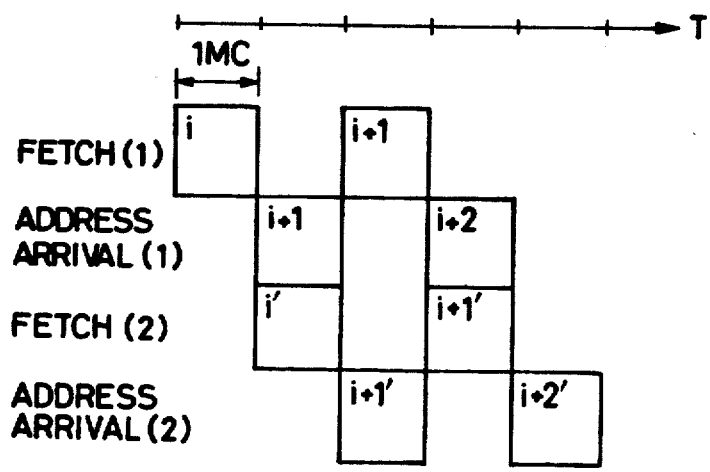
FIG. 12B is a diagram showing the timings of accesses to list data.

Heretofore, in accessing such a chain structure, the address of succeeding data has not been evaluated till the read-out of the content of certain data, and hence, the transmission of a fetch request for the next data has needed to wait the arrival of the preceding data. Thus, the same vacancies of a pipeline as in the sequential search operation arise (waiting the settlement of a comparison operation result in the sequential search operation corresponds to waiting the settlement of the address of the next data based on a data read-out result in the chain structure access). In contrast, the application of the present invention achieves the perfect pipeline implementation even in the access to the chain structure as seen from FIGS. 12A and 12B.

Concretely, when the foregoing embodiment in the case of the sequential search operation is altered as stated below, a modified embodiment for the list search is obtained.

First, regarding the instruction format in FIG. 2, the oprand OP3 is set as a search value, so that the search value itself is stored in the general-purpose register 205. Besides, the general-purpose register 208 is not used for an instruction in this case.

Figure 13:
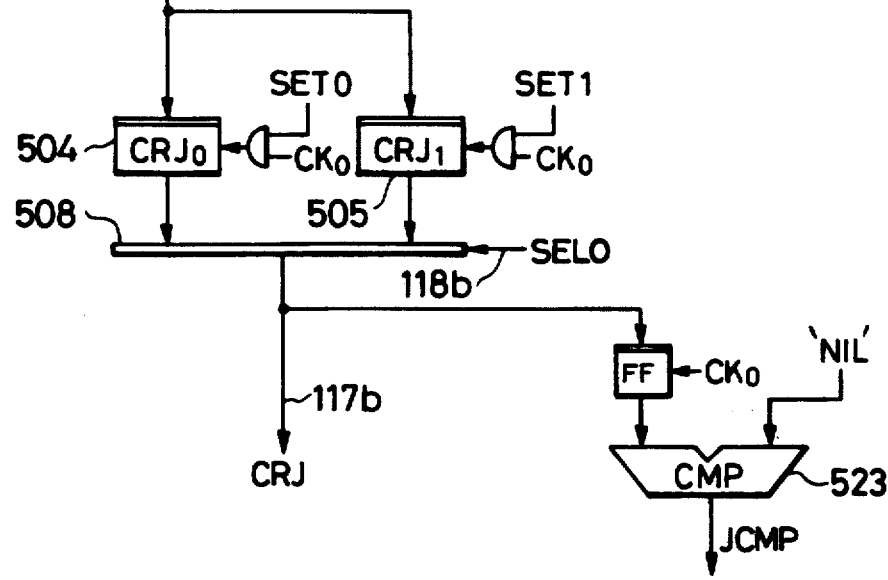
FIG. 13 is a diagram showing the modified parts of the address control circuit in the case of the list search operation.
Figure 14:
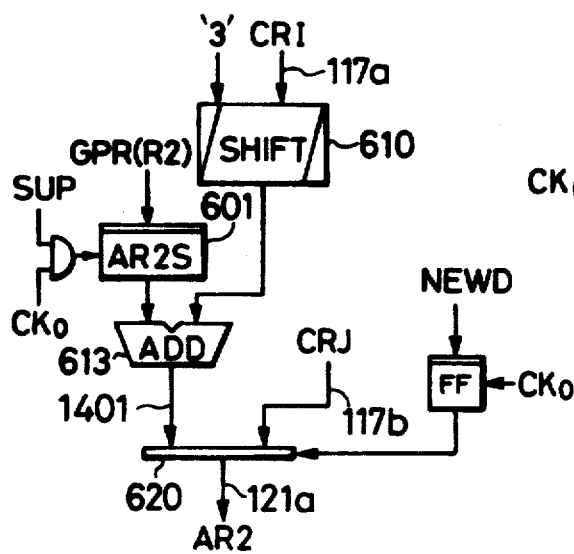
FIG. 14 is a diagram showing the modified parts of the address calculation circuit in the case of the list search operation.
Figure 15:
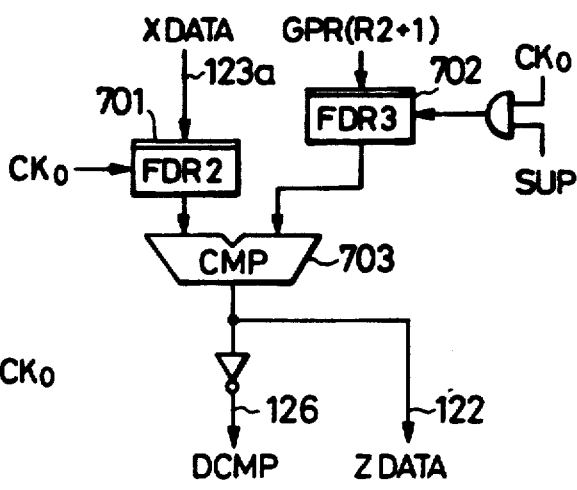
FIG. 15 is a diagram showing the modified parts of the operation circuit in the case of the list search operation.

Regarding the address control circuit 109 in FIG. 5, the registers 504 and 505 indicative of a displacement in the horizontal direction and the generator circuit for the element end detection signal JCMP need to be altered as shown in FIG. 13 (the others need not be altered). Unlike the countup result, the latter half part of a data element read out from the main storage 106, in other words, the address of the next data element is set in the registers 504 and 505. As in the case of the sequential search, which of the registers 504 and 505 is to be used in each cycle is instructed by the control signal SEL (118b) from the address system switch control circuit 104. The end of the chain can be detected since the value "NIL" is stored, and the result of the detection is sent to the next operation determination logic 509 as the signal JCMP.

In the address calculation circuit 105 in FIG. 6, the register 603 and an adder which are portions for calculating the address OP3 are unnecessary. Only when the process of a new chain has started (indicated by the signal NEWD), an address 1401 calculated from the signal CRI (117a) is used, and at any other time, the next data element address indicated by the signal CRJ (117b) may be used.

Besides, in the operation circuit 108 in FIG. 7, the store data buffers 704 and 705 are unnecessary. The search value stored in the general-purpose register 205 is set up in the data register 702, and the first half part of the data element is set in the data register 701 every cycle. The compared result 122 is stored as the store data 122, while a signal obtained by taking the negation of this compared result is sent to the next operation determination logic 509 as the signal DCMP (126). The reason why the negation is taken is that, in the sequential search operation, the comparison of elements is continued during the coincidence of data, the process of the next elements being started at the non-coincidence, whereas in the list search operation, the comparison with succeeding data in a chain is continued during the non-coincidence of data and is advanced to the first data element of the next chain at the coincidence.

In the above, the application of the present invention to the list structure data has been exemplified.

All the embodiment and modifications thereof mentioned here have referred to the search operations. It is to be understood, however, that the present invention is also applicable to other operations, for example, a case where integral values are stored in the first half parts of the respective data elements having the list structure of FIG. 11A and where "1" is added to all of them.

According to the present invention, in case of accessing a series of data groups, in a period of time since the transmission of an access request for certain data till the arrival of the data, a wait for the settlement of an operated result, or the like, different data logically irrelevant to the first-mentioned data can be accessed, so that an efficient pipeline process can be performed. The process can have its speed heightened even in a case where an operation for each pair of vector elements accompanies an unfixed number of times of fetches as in the sequential search operation illustrated in FIG. 9 by way of example.

Figure 10A:
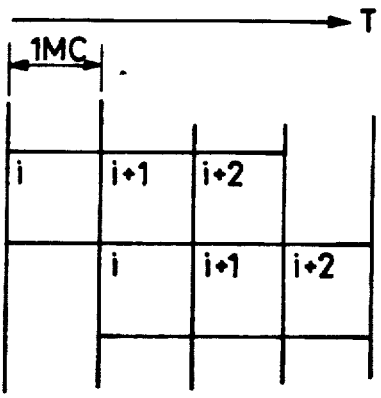
FIGS. 10(a), 10(b) and 10(c) are diagrams showing schemes for executing the sequential search operation.
Figure 10B:
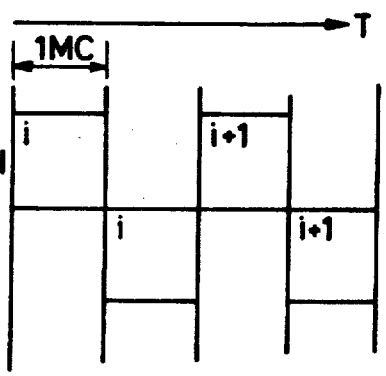
Figure 10C:
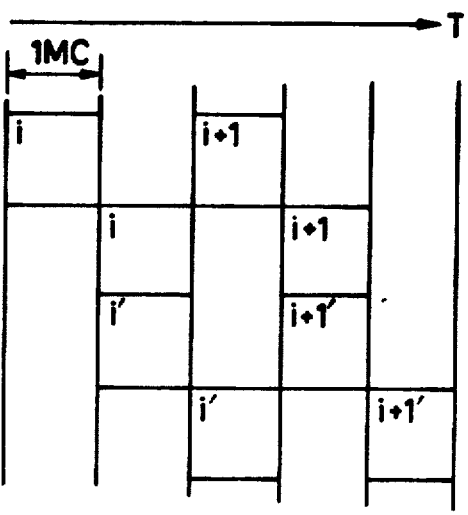

As to the sequential search operation, it is assumed that the element length is m bytes, that the total number of elements is n, that coincidence/non-coincidence can be decided by $\alpha$ times of comparisons on the average for each pair of elements, that l bytes can be fetched at one time, and that data items arrive k clocks after a fetch request. Then, processing periods of time in the respective schemes in FIGS. 10(a)–10(c) become as follows:

Scheme of FIG. 10(a) ... m·n/l (clock)
Scheme of FIG. 10(b) ... (k+1)·$\alpha$·n
Scheme of FIG. 10(c) (the present invention) ... $\alpha$·n Thus, when m=64, n=256, l=8, k=3 and $\alpha$=2 hold by way of example, the scheme of FIG. 10(a) ends the process in 2048 clocks, that of FIG. 10(b) ends it also in 2048 clocks, and that of the present invention ends it in 512 clocks and achieves a speed which is four times higher.

What is claimed is:

1. A data processor, comprising:
a memory for storing a group of data elements to be processed, said group of data elements being divided into a plurality of partial groups of data elements;
a plurality of address means connected to said memory, wherein each address means sequentially designates data elements belonging to plural ones of the partial groups according to a predetermined order of said partial groups and according to a predetermined order of data elements within each partial group, and wherein said plurality of partial groups are preassigned to said plurality of address means in such a manner that a partial group preassigned to n address means differs from a partial group preassigned to another address means;
control means connected to said plurality of address means for sequentially selecting different ones of said plurality of address means according to a predetermined order, wherein said sequential selection is repeatedly performed and for fetching from said memory a data element designated by a selected address means;
wherein said control means includes means for responding to said fetched data element and for determining whether a data element to be designated next by said selected address means is a succeeding data element belonging to the same partial group as the fetched data element belongs to or is another data element other than the succeeding data element, and for causing said selected address means to designate next, one of said succeeding data element and said other data element other than said succeeding data element in response to a result of said determining operation; and
said control means executing sequential election of another address means so that another data element designated thereby is fetched from said memory in parallel with said determining operation.

2. A data processor, comprising:
a memory for storing a group of data elements to be processed, said group of data elements being divided into a plurality of partial groups of data elements;
a plurality of address means connected to said memory, wherein each address means sequentially designates data elements belonging to plural ones of the partial groups according to a predetermined order of said partial groups and according to a predetermined order of data elements within each partial group, and wherein said plurality of partial groups are preassigned to said plurality of address means in such a manner that a partial group preassigned to an address means differs from a partial group preassigned to an other address means;
control means connected to said plurality of address means for sequentially selecting different ones of said plurality of address means according to a predetermined order, wherein said sequential selection is repeatedly performed and for fetching from said memory a data element designated by a selected address means;
wherein said control means includes determining means for responding to said fetched data element and for determining whether a data element to be designated next by said selected address means is a succeeding data element belonging to the same partial group as the fetched data element belongs to or is another data element other than the succeeding data element, and for causing said selected address means to designate next, one of said succeeding data element and said another data element other than said succeeding data element in response to a result of said determining operation; and said control means executing sequential selection of an address means so that another data element designated thereby is fetched from said memory in parallel with a determining operation performed by said determining means;

wherein said determining means includes means for performing a determining operation depending upon whether the fetched data element satisfies a condition predetermined for skipping of fetching of the succeeding data element.

3. A data processor according to claim 2, wherein: said another data element is a starting data element of a partial group next in order of a partial group, among said plurality of partial groups assigned to the selected address means, to which said fetched data element belongs.

4. A data processor according to claim 3, wherein memory addresses of data elements belonging to each partial group are uniformly spaced by a first address difference and a memory address of an ending data element of the partial group is separated by a second address difference from an address of a starting data element of a partial group next in order within the partial groups assigned to a same address means as the partial group is assigned.

5. A data processor according to claim 4, wherein addresses of all group elements of the data to be processed are uniformly spaced.

6. A data processor according to claim 4, wherein said control means further comprises:

first mean for detecting completion of fetching of all data elements of one of said partial groups assigned to one of said plurality of address means; and second means, responsive to detection of the completion, for causing said one address means to designate a starting data element of a partial group next in order to said partial group.

7. A data processor according to claim 6, wherein: said group comprises first and second groups, and said first group comprises first partial groups each comprising first data elements, wherein said second group comprises second partial groups each corresponding to one of said first partial groups, wherein each second a partial group comprises second data elements each corresponding to one of first data elements belonging to a corresponding first partial group wherein each address means includes means for sequentially designating pairs of data elements to be fetched from said memory, each pair comprising a first data element of one of said firs partial groups assigned to said address means and a corresponding second data element of a corresponding one of said second partial groups; and wherein said determining means includes pair determining means, responsive to whether a pair of first and second data elements fetched by one of said plurality of address means satisfy a predetermined condition, for determining whether a pair to be designated next by said one address means is a pair succeeding to the fetched pair or a pair other than the succeeding pair and for controlling said one address means so that a pair to be designated next by said one address means is the succeeding pair or the pair other than the succeeding pair.

8. A data processor according to claim 7, wherein said pair determining means includes means for determining the pair to be designated next, depending upon a comparison of values of the fetched pair of data elements.

9. A data processor according to claim 3, wherein the group of data elements to be processed comprises a set of vector elements having uniformly spaced memory addressed and each vector element comprises plural portions whose memory addresses are equally spaced; and wherein each partial group of data elements comprises plural portions of one of the vector elements.

10. A data processor, comprising:

a memory for storing a group of data pairs, each data pair including a data element to be processed and an address element indicating a next data pair which is to be fetched next after said data pair;

a plurality of address means connected to said memory, wherein each address means is responsive to address elements sequentially supplied thereto for sequentially designating data pairs indicated by the sequentially supplied address elements, wherein the group is divided into partial groups and each address means is predeterminedly assigned with plural ones of the partial groups, whose elements are to be fetched by the address means;

control means connected to said plurality of address means for initially supplying each address means with an initial address element pair indicating a starting data pair of partial groups assigned to said address means, for sequentially selecting different ones of said plurality of address means, so as to fetch one data pair designated by a selected address means from said memory, and for supplying said selected address means with next address elements included in the fetched data pair, as a next address element pair indicating a data pair to be designated next; and wherein said control means performs a selection of another address means so that another data pair designated thereby is fetched in parallel with the sequential supplying of the next address element pair to the selected address means.

11. A data processor according to claim 10, wherein said control means further comprises:

first means for detecting a fetching of an ending data pair of a partial group assigned to one of said plurality of address means;

second means, responsive to the detection of the fetching, for supplying said one address means with an initial address element indicating a starting data pair of a next group to be designated.

12. A data processor according to claim 11, wherein starting data pairs of the groups have regularly spaced memory addresses.

13. A data processor according to claim 10, wherein an address element in each data pair is a memory address.

* * * * *